Jan. 23, 1940.  I. NACHUMSOHN  2,187,888
COOKING APPARATUS
Filed May 21, 1936  3 Sheets-Sheet 3
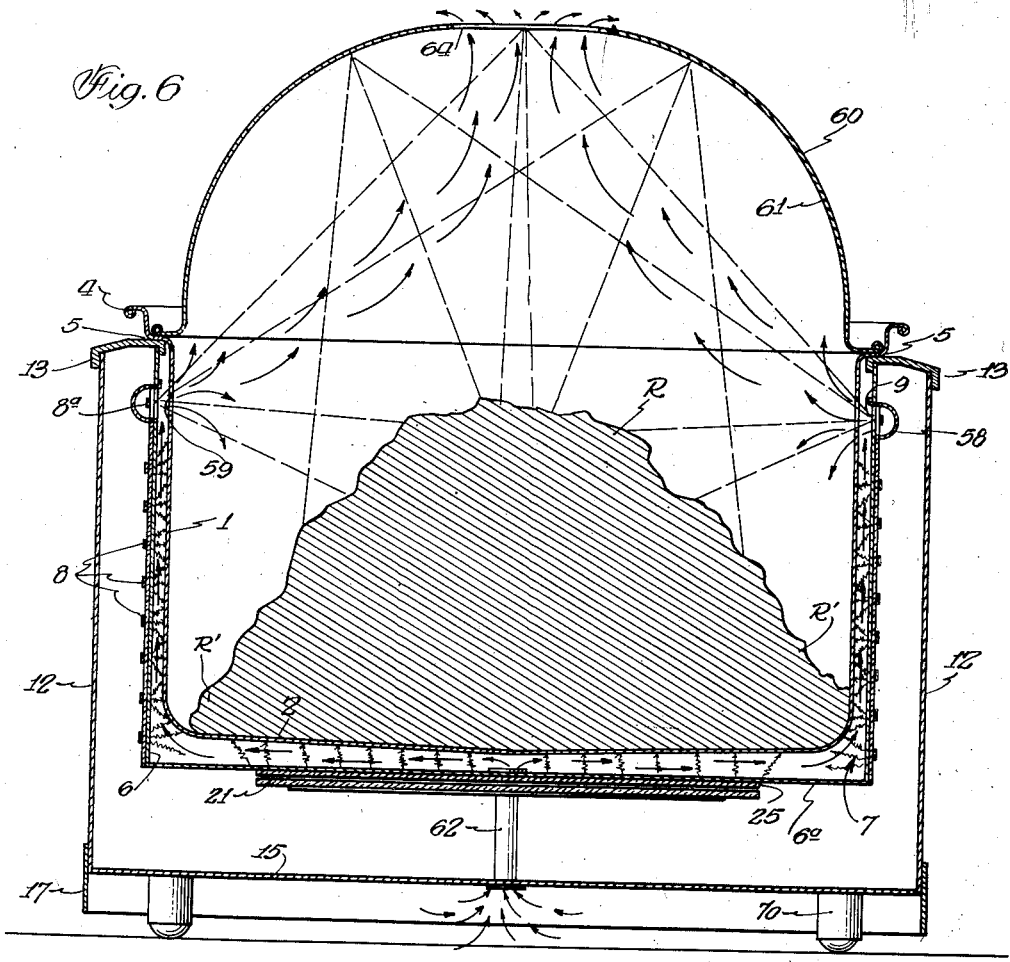
Inventor:
Irving Nachumsohn.
By:
Irving Nachumsohn
Attorney.

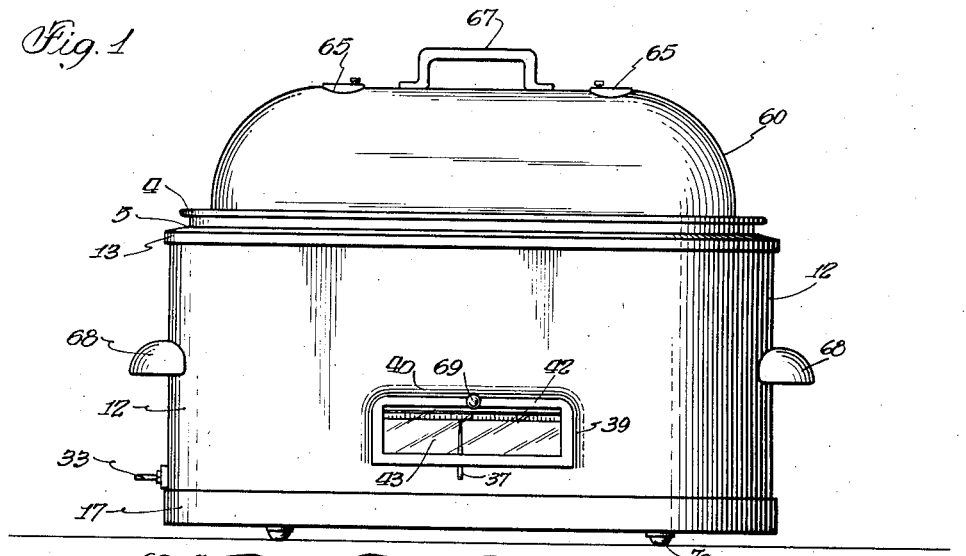
Fig. 1
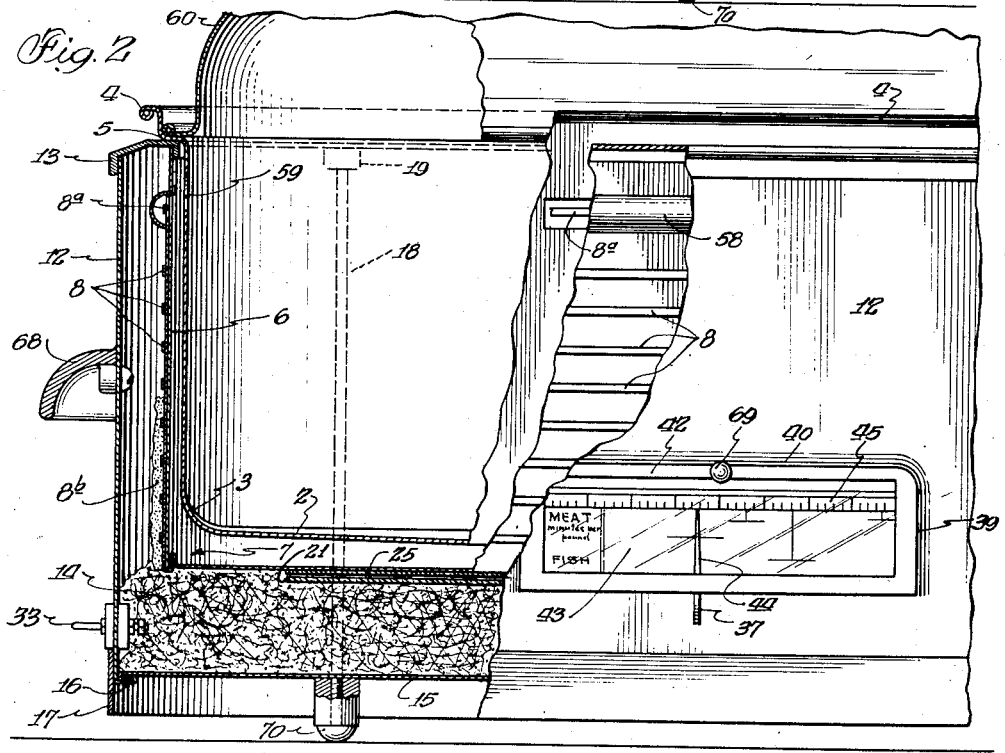
Fig. 2
Fig. 8
Inventor:
Irving Nachumsohn.
By: Irving Nachumsohn
Attorney.

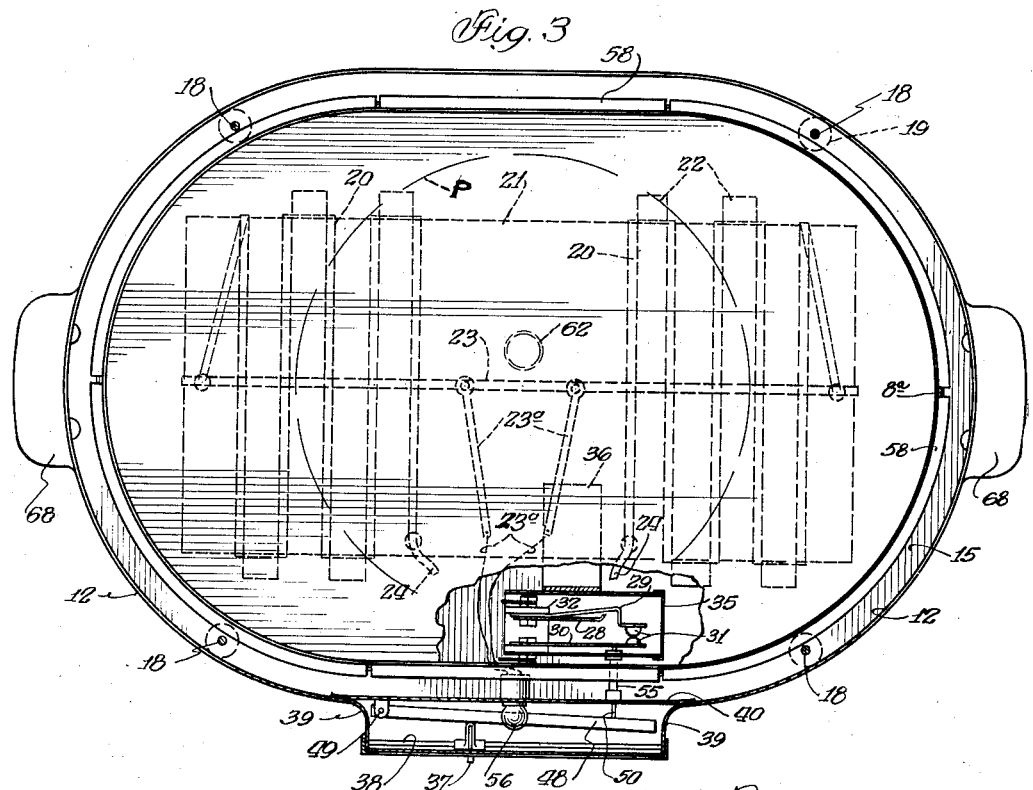
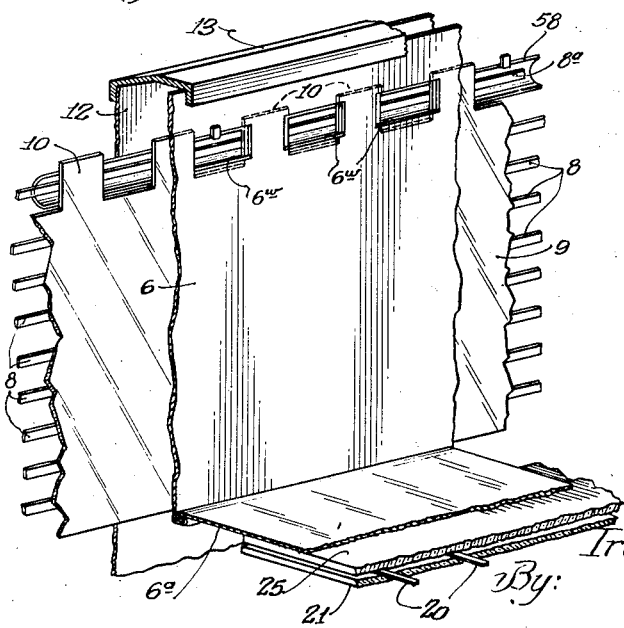
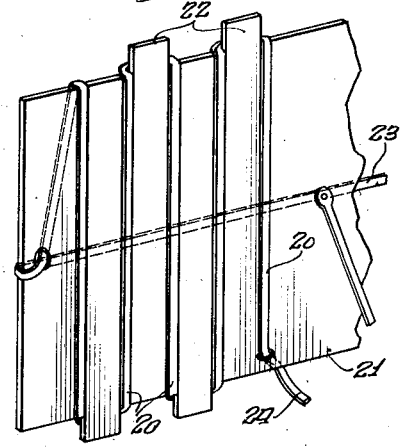

Patented Jan. 23, 1940

2,187,888

UNITED STATES PATENT OFFICE 2,187,888

COOKING APPARATUS

Irving Nachumsohn, Chicago, Ill.

Application May 21, 1936, Serial No. 80,946

9 Claims. (Cl. 219—35)

My present invention relates to a method and means for cooking electrically and more particularly it involves the method of cooking by means of an electrically operated appliance the latter of which is more specifically of the portable type. In one respect the apparatus shown in the present embodiment is comparable with a class of cooking devices now known to the public as electric roasters. However, as the specification progresses it will readily become manifest that numerous cooking applications other than mere roasting may be carried out with my invention by virtue of the features of novelty incorporated therein.

One object in my invention is to provide an improved cooking means capable of meeting the diversified phases in the general art of cooking, such as baking, searing, scalloping, steaming, stewing and so forth. A further object is to provide portable apparatus of the class described having new and useful features of construction and operation.

An important object of my present invention is to provide a portable electric roaster which positively overcomes, as expert cooking tests have proven, some of the objections existent in devices of this class in use heretofore. Considering such last named devices, it is well known that there is much to be desired by way of results from a scientific cooking angle; such results being much less satisfactory than those obtainable when similar foods are heat treated in gas, electric or other ranges of the larger and less portable type.

Considering electric roasters in use heretofore, their inherent shortcomings as compared with larger ranges are particularly noticeable when they are used to roast a fowl or other meats. One of the reasons for this is due to the fact that with the larger and less portable ranges, the problem of heat distribution by way of conduction, convection and/or radiation in order to treat all parts of the food in proper proportions is not so serious. This, because when a conventional oven roastpan containing the food is put into the comparatively large ovens the entire roastpan and food contents including even the lid occupy a relatively small portion in the oven and possess comparatively little mass next to the heated bulk comprising the oven and stove. Hence, if the covered roastpan is placed somewhat central in the oven and the heat distribution in the latter is even moderately uniform, the problem of treating all portions of the food properly is not so difficult. With an electrically operated roaster of the portable class however, the problem of distributing heat to all portions of the food contained in the food compartment is considerably more difficult because for reasons of compactness, efficiency as well as economy, it is essential that a more intimate relation be employed between the source of heat and the food to be treated thereby.

In the roasting of meats and other foods it is desirable that they are properly browned or seared and one of the disadvantages in the older type roasters above referred to resides in the fact that in order to brown or sear food prior to the subsequent and slower step of roasting, it has been necessary to partially or wholly fry such foods. This is exemplified by the fact that with such devices even the manufacturers thereof recommend "browning" a roast by turning the latter over several times in the preheated vessel in order to brown the surfaces of same. This procedure, in a true cooking sense, actually constitutes frying because browning or searing, as such, is accomplished by the drying effect on the surface of the food due to the application of heat other than by direct thermal contact between food container and food; the latter being the process which prevails when using the conventional frying pan over a heat source.

Electric roasters are desirably compact and light for the sake of portability and by virtue of their general design possess relatively little thermal inertia or heat storage capacity as compared with larger ovens of stoves or ranges. For this reason it is important to obviate the necessity of frequent handling and close watching of the food being cooked in an electric roaster since each time the lid of the latter is removed the internal temperature will drop rapidly, introducing attendant disadvantages in cooking by way of time and results.

Therefore, in carrying out an important object of this invention, the structure and arrangements of parts as well as the thermal values therein are such as to enable the attainment of more satisfactory results than with older types of electric roasters. For example, tests have proven that it is possible to place a fairly large portion of meat to be roasted in this unit, adjust the thermostat to predetermined value or values and after a given period of time produce a properly browned or seared roast without frequent removal of the cover of the roastpan. Thus, excessive heat and steam are not permitted to escape and less frequent attention or cooking experience is necessary.

To the attainment of these and numerous other objects and advantages which will become obvious as the specification progresses, my invention consists in the features of novelty described herein, illustrated in the accompanying drawings forming a part hereof and more particularly pointed out in the appendant claims.

In the drawings illustrating a preferred form of the invention, Figure 1 is a front elevation of the assembled apparatus; Figure 2 is an enlarged fragmentary showing of the apparatus as illustrated in Figure 1 with wall portions broken away progressively to illustrate the general arrangement of the parts. Figure 3 is a sectional plan view, looking downwardly along the line 3—3 of Figure 2; Figure 4 is an enlarged fragmentary view of the side wall and illustrates the improved form of heating element employed in the side walls of the apparatus; Figure 5 is a fragmentary view of the electric heating element employed to heat the bottom surface of the cooking vessel; Figure 6 is a vertical section taken along lines 6—6 of Figure 1; Figure 7 is the wiring diagram showing the electrical circuit employed and Figure 8 illustrates one of the many possible cooking charts which may be used in carrying out one or more of the aforementioned objects.

With particular reference to Figures 2 and 6, the oval-shaped roastpan is indicated as 1. The vertical walls of said pan are made integrally with the bottom 2 thereof and extend downwardly to join said bottom at rounded corners 3 provided for a purpose hereafter described. Adjacent the upper annular rim 4 of the roastpan a struck out shouldered portion 5 is provided to serve as the means for removably suspending the roastpan as shown.

Referring now particularly to Figures 2, 4 and 6, an outer pan 6 may be seen which houses the roastpan 1 and it is made somewhat larger than the latter. Unlike with the roastpan, the shell 6 has a square U-shaped cross-section the purpose of which is to provide a greater space between these two pans at the point 7 between their respective corners for reasons hereafter described.

The shell 6 has wound therearound an electrical heating element 8, said element being insulated from the shell by a band of insulating material 9 comprising mica, asbestos or any other suitable substance. I have found by employing a flat ribbon resistance element, instead of round wire, that several advantages are gained. In the winding of the resistance ribbon around the side walls of the inner shell, which operation is done before said shell is assembled to the other parts, it is preferable to first wrap this shell with the insulator 9 and thereafter to spiral the spaced windings tightly around the insulated periphery. Thus, by employing a ribbon element a greater tension may be exerted during the winding operation with less tendency for the winding to cut into the insulating band. At the same time the tension thus gained provides a more intimate thermal relation between the resistance element and the container 6 with considerably more area of contact between these elements due to the flat surface of the ribbon, and a consequent reduced thermal drop therebetween.

For proper browning or searing of a roast or other foods as heretofore explained I have found that it is highly desirable to provide a definite portion of purely radiant heat properly focussed on the food. This provision partially obviates the necessity of frequent attention and turning of the food during the cooking process and with the other values of conducted and convected heat properly proportioned I have found that a preparation of food may be cooked evenly and properly browned without human attention.

As shown in Figures 2 and 4 such a source of radiant energy is provided in the uppermost convolution 8A of the element 8. The ribbon element 8 (see Figure 2) is imbedded in a ceramic or other electrically insulating cement 8B, this expedient serving to retain the convolutions of resistance wire in permanent spaced relation; and it is preferable to coat the completed winding, with the exception of the portion 8A thereof, with asbestos or liquid porcelain substances well known in the art. By thus providing a plastic coating of insulating material on the completed winding and drying the same before the element-supporting shell 6 is assembled to the remaining parts, said coating protects the element during handling and permits an outer wall of heat-resisting material to be packed therearound without disturbing the winding proper. The cement 8B is shown only around the lower half of the winding 8, the upper turns being shown exposed for illustration purposes only.

In order that a portion of the heating unit, such as 8A, may act to convey radiant and reflected energy to the food, provision is made whereby a plurality of paths for said energy lead into communication with the food placed in the cooking pan 1. Referring now to Figure 4 it will be seen that this is accomplished by the provision of an annular row of rectangular windows, or openings 6w, disposed in a series adjacent the upper edge of the element-supporting vessel 6, said openings being located so as to permit the upper winding 8A to extend centrally and longitudinally of the series. In order that the element 8A be also electrically insulated from its support 6, the insulating band 9 is comb shaped, the upper edge thereof terminating in a series of lugs or teeth 10 which occur in alteration with the windows 6w.

Whereas the element 8 is virtually imbedded in a refractory material and its temperature is therefore kept comparatively low due to the thermal conductivity of the relatively dense mass surrounding the individual turns thereof the element 8A, even though it is of the same cross-section as the turns 8 and connected in series therewith so as to carry the same current, is permitted to attain a much higher temperature at the portions 11 thereof because said portions are suspended in air the thermal conductivity of which is relatively low. In operation, the portions 11 may be made to attain even a dull red visible glow while the turns 8 are kept considerably below this temperature because the dense or solid substance surrounding the latter comprises a more efficient thermal conductor which thus conducts the heat to the wall 6.

With the above described arrangement a continuous complete winding establishes two sources of heat; one, a spread out or diffused source of conducted heat which is uniformly distributed peripherally throughout the major area comprising the side wall of the vessel 6 and two, an upper source of radiant energy emanating from a plurality of individual points 11. However, in carrying out some of the enumerated objects of my invention, the mere provision of two sources of heat is not adequate, as will hereinafter appear, for the distribution of each source of heat to the proper locations as well as in correct proportions.

A band of metal 12, ovalled in a uniformly spaced relation around the element-supporting member 6, serves as the outer casing of the device. An oval frame 13 made either of a casting or a metal stamping is provided. Said frame has an inverted U-shaped cross-section the parallel side walls of which serve to maintain a uniform separation between members 6 and 12, the space therebetween comprising a hollow wall in which is packed any of the well known heat insulating substances 14, such as asbestos fibres, mineral wool or the like. In order to complete the enclosure necessary for the outer casing an oval-shaped bottom 15 is provided. This bottom may be fastened to the outer band 12 as shown at 16, Figure 2. A relatively short band of metal 17 comprising an ornamental skirt, may be employed around the lower edge of the band 12 to embellish the device. Four vertical strut posts 18 may also be used to draw the frame member 13 tightly against the band 12 in which case the upper ends of these posts may be provided with threads adapted to screw into tapped holes in the horizontal wall of the member 13. If the latter is of cast metal, depending bosses 19 cast integrally therewith and having tapped holes may be provided to receive the upper ends of the strut posts.

In order to facilitate the distribution of heat to the food in the proper proportions referred to an extra flat heating unit clearly shown in Figures 3, 4 and 5 is provided, said element being disposed in close thermal relation to the bottom of the element-supporting vessel 6. The ribbon resistor 20 constituting this element is wound on a sheet of refractory material 21, such as asbestos or mica, in the manner shown in Figures 3 and 5. Several projecting portions 22 of the member 21 serve to retain the parallel portions of the wire 20 in fixed spaced relation. It will be observed that this heater element is a continuous unbroken ribbon wound in two halves or sections, series-connected by a central portion 23 thereof and terminating at ends 24. A plate of heat-resisting insulation 25 serves to prevent the metal bottom 6A from short-circuiting the wires 20 and another similar plate 26 may be disposed on the opposite side of the element-supporting plate 21. This bottom element should be held firmly to the bottom 6A in any suitable manner. One method for accomplishing this is to cement the three plates as a unit and thereafter to cement, clamp or rivet this unit to the bottom 6A. In any event the insulation packing 14 further serves to press the unit upwardly.

One reason for dividing the bottom element into two separated halves is to provide a means to compensate for the oval shape of the entire device. In the absence of a suitable compensating medium, certain shaped foods centrally located within the cooking compartment will have a tendency to cook or bake faster along the opposed parallel front and back sides of the compartment. This is readily made manifest in practice by baking a pie or cake in the device. A fairly large round pie, centrally placed P in Figure 3, will ordinarily bake more rapidly at the portions where the periphery comprising the solid crust thereof occurs closest to the oval shaped wall of the food compartment. By thus separating the lower element into two halves the extreme ends of the oval compartment are given an added source of heat which applies to the end portions of the food, baking the latter uniformly. During baking it may be desirable to elevate pies, cakes and the like, in order that they occur in a position, vertically, that is somewhat central with respect to the covered enclosure. This may be readily accomplished by disposing the baking dishes on top of similar but inverted dishes or pans, or on an elevated wire rack, or shelf, not shown.

In addition to the electrical heating elements just described, provision is made for setting and maintaining the temperature of the cooking vessel at any predetermined value. Such provision comprises a thermostat consisting of a strip of thermostatic bi-metal 28, a thermo-responsive contact-supporting spring 29 and a manually adjustable but similar contact-spring 30. These spring contact tongues support a pair of co-operating contact points 31, in a well known manner. The entire contact tongue and bi-metal assembly comprising this thermostat is supported from a unitary U-shaped electrically insulating base member 32 made of porcelain or any other suitable heat-resisting material. The thermostat is connected between one of the current supply wires 33 and the heating elements, the other circuitous end of the latter terminating a second current supply wire 34. The thermostat assembly is enclosed in a metal case 35 and a strip of metal possessing high thermal conductivity serves to maintain an intimate thermal relation between the thermostat and the bottom 6A of the element-supporting vessel. This may be accomplished by inserting one portion of the metal strip 36 between the insulating sheet 25 and the bottom 6A, the other end portion of said strip being wrapped around or otherwise thermally and mechanically fastened to the case 35. The latter may be further fastened to the bottom 6A by means of screws or rivets not shown.

In order that a user of the apparatus may get the device to operate at any desired temperature, a manually adjustable control member 37 is provided. Said member is slidably disposed on a horizontal rod 38 which is supported at its ends from opposed wall portions 39 formed integrally with the band 12. The vertical wall portions 39, a similar drawn out horizontal wall formation 40, together with a rear wall plate 41 spot-welded to band 12 comprise a rectangular box-like enclosure into which temperature regulation and indicating apparatus is placed. A door 42, made transparent by a glass window 43 therein, is hinged for opening; the extreme ends of the slide rod 38 forming two pivoted supports therefor.

The adjustable slide 37 is formed to present an integral vertical pointer 44 adapted to indicate the temperature at which the device is set, by indexing on a suitably calibrated temperature indicating scale 45, said scale being etched into or otherwise disposed on the glass window. The control member 37 is also provided with an integral horizontal portion 46 extending towards the body of the apparatus and comprising a shoe adapted to slidably engage a lever 48. This lever is pivotally supported from plate 41 as shown at 49 and is adapted to co-operate with the slide shoe 46 in such a manner as to enable the particular horizontal position of the slide to determine the angle which the lever 48 will described with respect to the plate. This angular adjustment, in turn, determines the horizontal movement of a plunger pin 50, the uninsulated end of which butts against the inner face of the square lever 48 and the inner insulated end 51 of which likewise presses against the contact-supporting tongue 30. The tension in the latter serves to at all times maintain a yieldable and therefore adjustable mechanical connection between the tongue 30 and the control member 37 so that a movement of the latter to the right, for example, will, through the structure just described, cause the contacts to close. The spring 30 is possessed with a forward tension which normally tends to bring the front contact point thereof away from the rear contact of spring 29. This latter spring is also given an initial forward tension so that it is at all times in yieldable contact with the curved end of the bi-metallic strip 28. In line with thermostat design, the tension of spring 29 should not be so great as to impose an excessive load on the bi-metal for the latter must be free to flex in response to changes in temperature.

As shown in Figures 2 and 8, the device may be provided with a plurality of cooking charts 53 comprising removable cards or etched metal plates adapted to be selectively inserted into the rectangular enclosure by opening the small door thereof. As shown to the left of each chart, they are tabulated to indicate the general class of foods listed thereon. The respective foods are grouped horizontally along the chart so that each group will lie adjacent a corresponding temperature indication on the scale that it is recommended to cook such foods at. Thus, it will be seen that each chart comprises a series of indices 54, which fall below predetermined temperature readings on the scale 45 and that any one index 54 may be allotted to a group of food preparations that require cooking at the same temperature. A hollow strut post 55 (Figure 3) fastened at one end to the plate 41 and at the opposite end to the thermostat case 35, serves to maintain a fixed mechanical relation between the temperature setting apparatus contained in the thermostat case. Thus, warpage or distortion of the metal parts which might tend to change the relation between the apparatus contained in these two enclosures is prevented by virtue of the rigid connecting medium 55 therebetween which, at the same time, serves to protect the slide pin therein from the packing or insulation surrounding it where it extends transversely through the walls.

With the above described arrangement it will be observed that I have combined temperature setting and indicating apparatus with pre-arranged and pre-calibrated cooking charts in such a manner that a novel combination is effected and that new and useful results are obtainable thereby. Opposite each food item printed on a given chart is a figure which represents the length of time, in minutes or hours, that the specified quantity of food requires cooking. Therefore, in the use of the device it is not essential that the user thereof have any knowledge of cooking since it is only necessary to place a given food or food preparation into the device, move the control member 37 (which when in the "off" position to the extreme left opens the contacts) to the right until the pointer thereof falls into registration with the index under which the particular food to be cooked is listed. Thus, no knowledge of temperature nor time requirements for a given food is necessary, for the temperature is automatically selected when the food is indexed and the cooking time for that particular food is then instantly readable opposite the food thus indexically selected. While for the purpose of this patent I have shown and described a specific form of temperature control and indicating apparatus coupled with a method of setting the apparatus with one or more food charts which in effect constitutes an electric cooker with a built-in cook book; and while the workable arrangement is described in sufficient detail for a mechanic skilled in the art, said apparatus is more specifically described and claimed in my copending application for patent, Serial No. 162,208.

A pilot lamp 56 is disposed within the cook book compartment so as to illuminate the exposed cooking chart, making the latter readable through the glass window 43. For purposes of safety said lamp is of the low voltage flashlight bulb type and current therefor is derived by virtue of the potential drop across the section 23 of the bottom heater. Ordinarily a device of this character might be operated on a 110 volt, 60 cycle A. C. lighting or power circuit. With the pilot bulb potential derived from spaced points adjacent the electrical center of the element, should a person obtain a shock by contact between a possibly exposed portion of the lamp base or any other live conductor and ground, the voltage therebetween would not be much above 55 volts. This expedient provides a safety measure against electrical shocks. A pair of wires 23b leading from the lamp completes the lamp circuit to the section 23 through a corresponding pair of terminal lugs 23A connected across the latter.

With particular reference to Figure 7 it is to be noted that the heater circuit comprises two parallel-connected halves. By virtue of the relatively large periphery of the side wall of the element-supporting vessel, as compared with the bottom thereof, coupled with the fact that the ribbon resistor is of the same cross-section throughout the device, the major part of the winding is adjacent the side walls. Thus, in order that both parallel halves of the heater circuit shall possess substantially the same resistance it is necessary that the side heater be tapped for connection with line wire 34 towards one end of the side heater, as shown at 57. The other line wire 33 is connected to the heater circuit through the thermostat contacts and a resistor r of relatively high value may be employed to minimize arcing between said contacts.

In the operation of the device the pilot lamp serves the dual purpose of first illuminating the exposed page of the loose-leaf cook book the moment the control knob is pushed to the right from the extreme left "off" position; such illumination remaining steady for a while to permit the user to more easily read the cooking information and to thereupon locate the pointer to the exact position required. Then the lamp continues to burn steady only until the temperature within the cooker increases to the point selected by virtue of the food indexed, whereupon the lamp flashes on and off intermittently with the thermostat action. The intermittent flashing therefore serves to indicate that the proper temperature has been reached and is being maintained. Thus the reading of the cook book occurs under desirably steady illumination whereas the intermittent illumination, which is objectionable for reading purposes, does not commence until after the cooking chart has been read.

With reference to Figure 6 it will be noted that radiant energy emanating from element 8A travels as indicated by straight broken lines. In this connection a reflector 58, comprising a series of annular channels made of aluminum or other suitable material, is disposed to the rear of the element 8A so that the radiant energy directed towards the rear of said element will be reflected into the cooking vessel where it will directly or indirectly strike the food. The food vessel 1 is provided with a series of windows 59 which fall into respective registration with the openings 9 and permit the radiant energy to pass freely into the food compartment. A cover or dome 60 removably fits into the upper portion of the vessel 1 by adapting the rim of the former to rest upon the horizontal shoulder 5. The inner surface 61 of the cover is coated preferably with a white or other light color vitreous enamel so that any heat energy directed upwardly will be reflected downwardly upon the food as indicated by the straight broken lines.

To further compensate for and with the view of minimizing the heat conveyed to the food by direct thermal contact between the food container and food, a vent 62 may be provided. This is shown in the form of an elongated tubular eyelet which extends transversely through the lower heating element, the inner bottom 6A and the outer bottom 15, and provides a port into which cold air may be drawn upwardly and circulated around the outer surface of the vessel as indicated by the heavy arrows. This effect due to convection serves to bring the initial cold air into contact with the middle of the vessel 1 first, whereupon said air spreads radially in all directions, passes upwardly between the vessels 1 and 6, entering the latter through windows 59 and finally leaving the vessel through one or more openings 64. The openings are made adjustable by means of dampers 65, in a well known manner.

The above described expedient improves the efficiency of the apparatus in several ways. First it provides a compensating medium similar to that effected by splitting the lower element into two halves for the purpose heretofore described. Secondly, it compensates for the thermal advantage that the lower portion of the food ordinarily possesses because of its intimate contact with the bottom of the cooking vessel, by chilling the entire lower portion of the vessel to a greater degree than the side walls thereof, since the air currents become hotter as they progress through the device. Thirdly, this expedient provides an adjustable medium for circulating air through the apparatus where, in the cooking of certain foods, it may be desired. In this latter respect it is to be noted that the cooking effect of the radiant heat may be increased in proportion to the convected and conducted heat, since by merely opening the vents 65 the total effect of the latter forms of heat are minimized by virtue of the air circulation while the radiant heat remains relatively constant.

The device may be finished by providing the dome with a handle 67. Portability of the apparatus as a unit is facilitated by the provision of a pair of side handles 68 fastened to the outer band. Opening the door of the cook book compartment may also be facilitated by the provision of a small knob 69 cast integrally with the frame structure 42. Finally, the bottom may be provided with feet 70 fastened to the lower ends of the strut posts 18.

I claim:

1. In portable cooking apparatus, the combination with a substantially rectangular shaped cooking vessel terminating upwardly in a peripheral rim which rim is disposed in a horizontal plane, said vessel having closed side wall and bottom portions, a raised cover for said vessel having a depending rim adapted to engage the peripheral rim of said vessel to form a substantially closed cooking compartment, a source of heat distributed in desired proportions about said side wall and bottom portions of said vessel and a plurality of openings arranged in annular series towards the upper portion of said side wall portions and adjacent said peripheral rim.

2. In a device of the character described, the combination with a receptacle having an electric heating element in intimate thermal relation with the periphery thereof; of a cooking vessel within said receptacle disposed for removal upwardly therefrom; and having a substantial air space between said receptacle and vessel to provide media for a thermal drop therebetween; and additional heating elements adjacent the bottom of said receptacle providing a plurality of heated zones spaced apart so as to create a relatively colder portion in said bottom towards the center thereof.

3. In a device of the character described, a receptacle having an electric heating element in thermal relation therewith, a cooking vessel within said receptacle and removable upwardly therefrom, said vessel having a plurality of openings adjacent the rim thereof, an air space between said receptacle and vessel including an atmospheric air inlet therebelow in communication with the said air space and said openings and a dome for said device having means for permitting escape of air rising upwardly through said openings.

4. In a device of the character described, a receptacle, an electric heating element comprising a source of heat adapted to heat the interior of the vessel through the walls thereof, another heating element comprising another source of heat disposed adjacent the side wall of said receptacle and adapted to directly heat the interior of said receptacle, a reflector disposed to the rear of said last-named element and adapted to reflect heat from the latter into said receptacle, a cooking vessel disposed within said receptacle for removal upwardly therefrom and adapted to be heated by both said sources of heat, and a cover for said cooking vessel having an inner reflecting surface for further directing said reflected heat into said vessel.

5. An electric cooker comprising a receptacle, an electric heating element confined in the lower portion of the sides thereof and effective to heat the lower interior of the receptacle by conduction, and an exposed electric heating element carried by the receptacle in proximity to the upper portion of said sides to heat the upper interior of the receptacle by radiation, said upper portion of the receptacle sides being perforated opposite said exposed element.

6. The structure of claim 5, said exposed element having a horizontal course along said sides, and reflecting means along said course to concentrate the heat from said exposed element in the direction of said upper interior.

7. The structure of claim 5, said exposed element having a horizontal course along said sides, and a channel-shaped reflector along said course to concentrate the heat from said exposed element in the direction of said upper interior.

8. The structure of claim 5, said exposed element being a strip having a horizontal course along said sides, and a channel-shaped longitudinal reflector facing inwardly to dispose said strip in the direction of said upper interior.

9. The structure of claim 5, a food vessel spacedly disposed within the receptacle, and means to vary the proportions of heat from said elements by air convection in the space between the receptacle and vessel.

IRVING NACHUMSOHN.